US006896365B1

(12) United States Patent
Lin

(10) Patent No.: US 6,896,365 B1
(45) Date of Patent: May 24, 2005

(54) SOFT PAD STRUCTURE OF GLASSES

(75) Inventor: Kuo-Tseng Lin, Taipei (TW)

(73) Assignee: Gazelle Corporation, Taipei (TW)

( * ) Notice: Subject to any disclaimer, the term of this patent is extended or adjusted under 35 U.S.C. 154(b) by 0 days.

(21) Appl. No.: 10/760,419

(22) Filed: Jan. 21, 2004

(30) Foreign Application Priority Data

Nov. 14, 2003 (TW) ...................................... 92220176 U

(51) Int. Cl.[7] ............................................. G02C 11/08
(52) U.S. Cl. ........................... 351/62; 351/86; 351/103; 351/106
(58) Field of Search ............................. 351/83, 86, 90, 351/92, 103, 106, 62, 41, 154, 85; 2/435

(56) References Cited

U.S. PATENT DOCUMENTS 3,829,201 A * 8/1974 Whiting ...................... 351/154

* cited by examiner

Primary Examiner—Hung Xuan Dang

(74) Attorney, Agent, or Firm—Rosenberg, Klein & Lee

(57) ABSTRACT

The present invention discloses a soft pad structure of glasses having a soft pad. The soft pad includes a fixing member of long shape to wrap the edge of an upper portion of the eyeglass. The fixing member forwarding the inner and outer sides of the eyeglass extends down to form a lining pad and a decorative member to cover the inner and outer surfaces of the eyeglass. The eyeglass and the fixing member of the soft pad are embedded in an embedding trench of the frame body to be form-integrated. The lining pad can be a leaning pad for providing comfortable wearing experiences for users and the decorative member can be coating in different colors to enhance the appearance while wearing. In addition, the soft pad of the present invention can be assembled rapidly and firmly with out any manual tools to improve the purpose of convenient combination and easy repair.

28 Claims, 5 Drawing Sheets

SOFT PAD STRUCTURE OF GLASSES

BACKGROUND OF INVENTION

1. Field of the Invention

The invention relates to a soft pad structure of glasses, and more particularly, to a soft pad having a lining pad for providing comfortable wearing experiences for users and can be rapidly combined to a glass frame. The soft pad can be further extended to form a decorative member to decorate the glasses.

2. Description of the Prior Art

For coping the different requirements, the glasses are developed and having various kinds of glasses nowadays, such as the industrial safety glasses, the sunglasses, the sports glasses and the sight corrective therapy glasses. When a user chooses a pair of glasses, the most important key point is the comfort. There are many reasons affect the wearing comfort, such as the material, the weight and the size of the glass frame, and the installing angle, the installing method and the material of the nose pad.

For improving the comfort while a user wears, a foamed plastic is attached to the inner surface of the upper portion of the eyeglass to form a lining pad. When a user wears the glasses, user's face can close to the lining pad without directly contacting the hard frame. This design can improve the comfort of wearing and avoid imprinting the face after a long time wearing. In addition, if the glasses are industrial safety glasses, this design can prevent the face from directly crashing of the hard frame while the glasses are crashed. However, as the conventional glasses utilize the foamed plastic to be a leaning pad, the crash-resistance and the comfort are bad and the leaning pad is unchangeable, so it is inconvenient for repairing. Besides, an attachment process is increased while manufacturing the glasses, so the efficiency will be lowered and the cost will be increased.

SUMMARY OF INVENTION

It is therefore a primary objective of the present invention to provide a soft pad structure of glasses having a lining pad extended from the inner surface of the upper portion of the eyeglass to be a leaning pad for providing comfortable wearing experiences for users.

It is therefore another objective of the present invention to provide a soft pad structure of glasses having a decorative member extended from the outer surface of the upper portion of the eyeglass, and the decorative member can be coating in different colors to enhance the appearance while wearing.

It is therefore a further objective of the present invention to provide a soft pad structure of glasses that can be assembled rapidly and firmly to improve the purpose of convenient combination and easy repair.

It is therefore a further objective of the present invention to provide a soft pad structure of glasses that extends out to form a nose pad to support the glasses on the user's nose for providing comfortable wearing experiences for users.

According to the present invention, a soft pad structure of glasses comprises at least one fixing frame, an eyeglass and at least one soft pad. The soft pad is equipped on the eyeglass and includes a fixing member of long shape to wrap the edge of an upper portion of the eyeglass. The fixing member forwarding the inner side of the eyeglass extends down to form a lining pad, and the lining pad covers the inner surface of the upper portion of the eyeglass to be a leaning pad for providing comfortable wearing experiences for users. The lining pad corresponding to the center position of the eyeglass further extends down to form a connection member, and the connection member forwarding down extends left and right to respectively form a nose pad strip and form a nose pad of inverted V shape. The nose pad is equipped on the eyeglass. In addition, the fixing member forwarding the outer side of the eyeglass extends down to form a decorative member, and the decorative member can be coating in different colors to enhance the appearance while wearing. The eyeglass and the fixing member of the soft pad are embedded in an embedding trench of the fixing frame, and are assembled with the fixing frame. The left side and the right side of the fixing frame can be further extended out to form a frame body.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
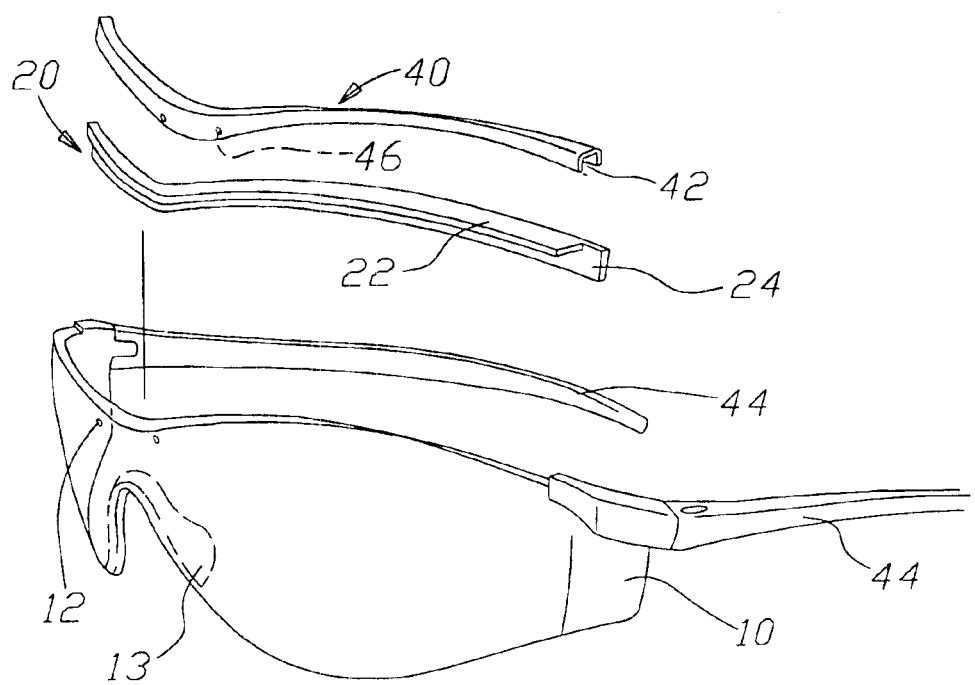
FIG. 1A is a perspective view of a first preferred embodiment according to the present invention.
Figure 1B:
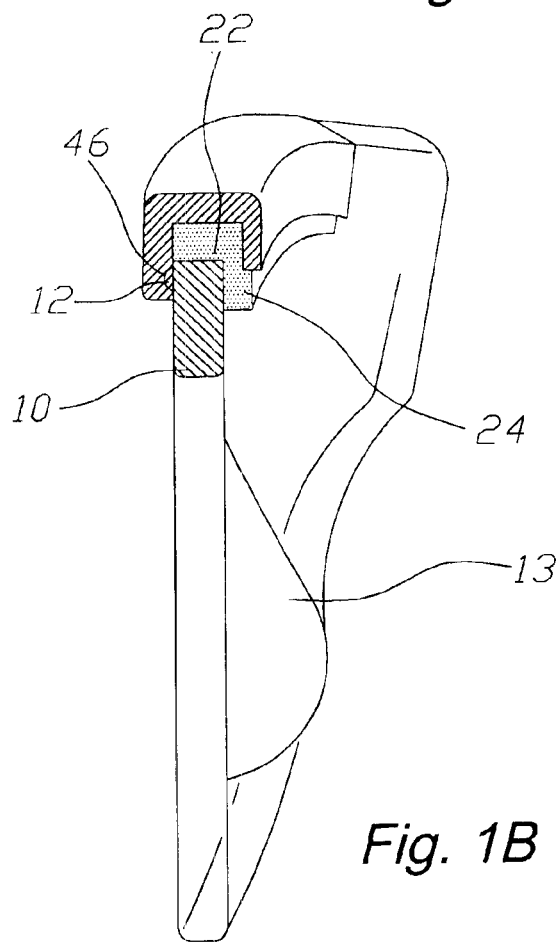
FIG. 1B is a cross-sectional view of FIG. 1A for showing assembly thereof.

Please refer to FIGS. 1A and 1B, which are the perspective view of the first preferred embodiment according to the present invention and the cross-sectional view of FIG. 1A for showing assembly thereof. As shown in figures, the present invention includes an eyeglass 10 and a soft pad 20. The eyeglass 10 can be form-integrated, and the soft pad 20 includes a fixing member 22 of long shape. The fixing member 22 wraps the edge of an upper portion of the eyeglass 10, and the fixing member 22 forwarding the inner side of the eyeglass 10 extends down to form a lining pad 24 of long shape to cover the inner surface of the upper portion of the eyeglass 10. The fixing member 22 and the lining pad 24 are of "⊓" shape such that the lining pad 24 can be a leaning pad for wearing the glasses, and the material of the soft pad 20 is soft and elastic material to improve the comfort for the user while wearing the glasses. The eyeglass 10 and the fixing member 22 of the soft pad 20 are embedded in an embedding trench 42 mounted on a fixing frame 40. The soft pad 20 and the fixing frame 40 can be assembled together easily and rapidly without any manual tools, and the glasses arm 44 is provided on the left side and the right side of the eyeglass 10 respectively for wearing.

In addition, in order to improve the firmness of the eyeglass 10 installed on the fixing frame 40 and prevent the soft pad 20 and the eyeglass 10 from falling, at least one fixing pillar 12 is provided in the surface of the eyeglass 10 and a fixing hole 46 is provided on the position of the fixing frame 40 corresponding to the fixing pillar 12, so as to the fixing pillar 12 can be inserted into the fixing hole 46 for jointing. A nose pad 13 is provided on the center position of the inner surface of the eyeglass 10. This glass with the nose pad 13 can provide comfortable wearing experiences for users.

Figure 2A:
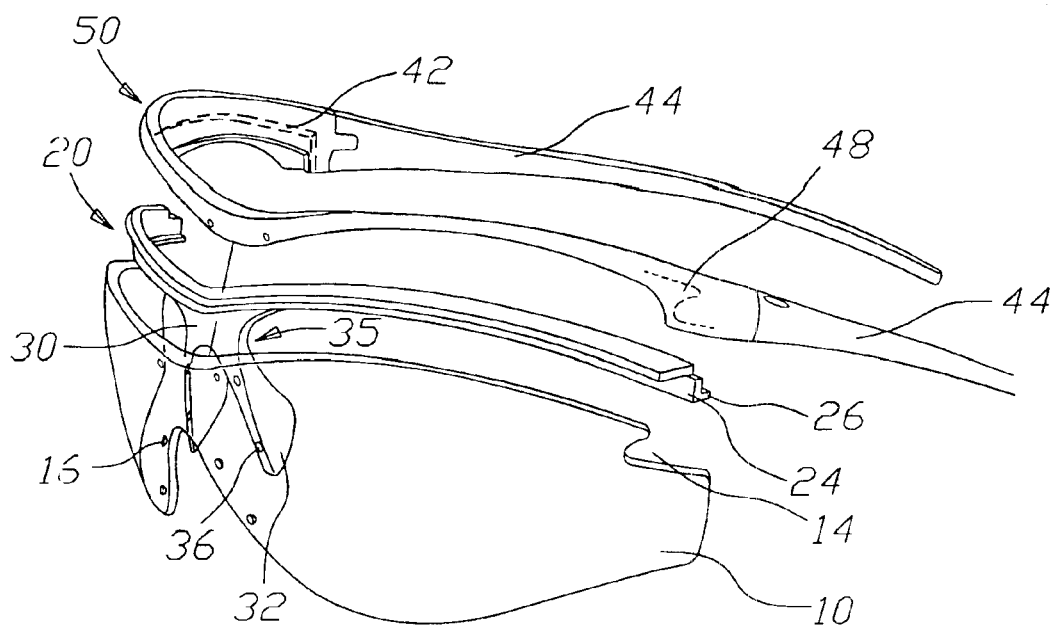
FIG. 2A is a perspective view of a second preferred embodiment according to the present invention.
Figure 2B:
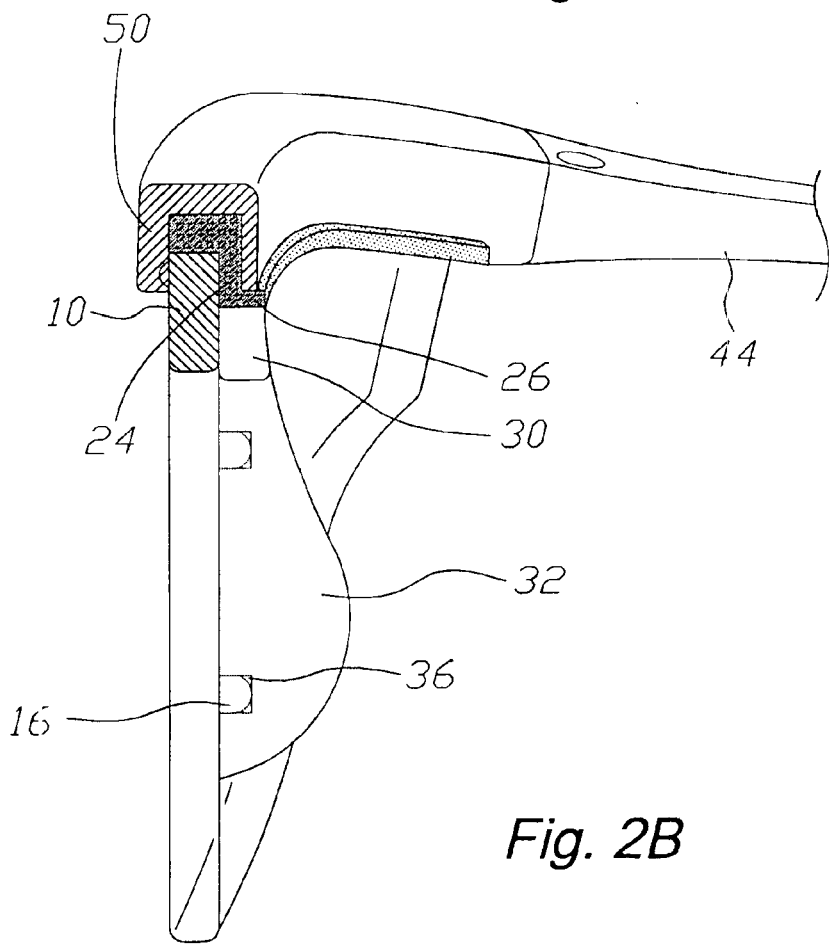
FIG. 2B is a cross-sectional view of FIG. 2A for showing assembly thereof.

Please refer to FIGS. 2A and 2B, which are the perspective view of a second preferred embodiment according to the present invention and the cross-sectional view of FIG. 2A for showing assembly thereof. As shown in figures, in the first embodiment, the lining pad 24 and the fixing frame 40 are not aligned flatly, so as to an imprint will be easily formed on the user's face and lead to uncomfortable experience while wearing glasses. In the second embodiment, for providing more comfortable wearing experiences for users, the bottom of the lining pad 24 further extends out to form a first extending pad 26, and the lining pad 24 and the first extending pad 26 are of an L shape to align or jut out the fixing frame 40 for preventing the user's face from hurting by the edges and corners of the fixing frame 40. In addition, in this present invention, the left side and the right side of the fixing frame 40 can further extend out to form a frame body 50, and two grooves 14 are provided on the left side and the right side of the eyeglass 10, respectively. The eyeglass 10 is embedded in the embedding trench 42 of the frame body 50, and the groove 14 can embed with a protruding portion 48 at the left side and the right side of the embedding trench 42 to strengthen the combination of the eyeglass 10 and the frame body 50. Besides, the, glasses arm 44 is provided on the left side and the right side of the frame body 50 respectively for the user wearing.

In addition, for improving the practicability of the soft pad 20, the lining pad 24 corresponding to the center position of the eyeglass 10 further extends down to form a connection member 30, and the connection member 30 forwards down and extends to the left side and the right side respectively to form a nose pad strip 30 and form a nose pad 35 of an inverted V shape. Each nose pad strip 32 has a assemble hole 36, and the center position of the eyeglass 10 is of an inverted V shape. Two sides of the eyeglass 10 corresponding to the assemble hole 36 have a joint pillar 16 for coordinating the assemble hole 36 to equip the nose pad 35 onto the eyeglass 10. The joint pillar 16 of the nose pad strip 32 is inserted into the assemble hole 36 to combine with the eyeglass 10. However, the combination of the eyeglass 10 and the nose pad 35 can also be others, such as that the joint member of the eyeglass 10 is a hole and the assemble member of the nose pad strip 32 is a pillar. The nose pad 35 and the soft pad 20 are form-integrated, and are of soft and elastic material.

Figure 3A:
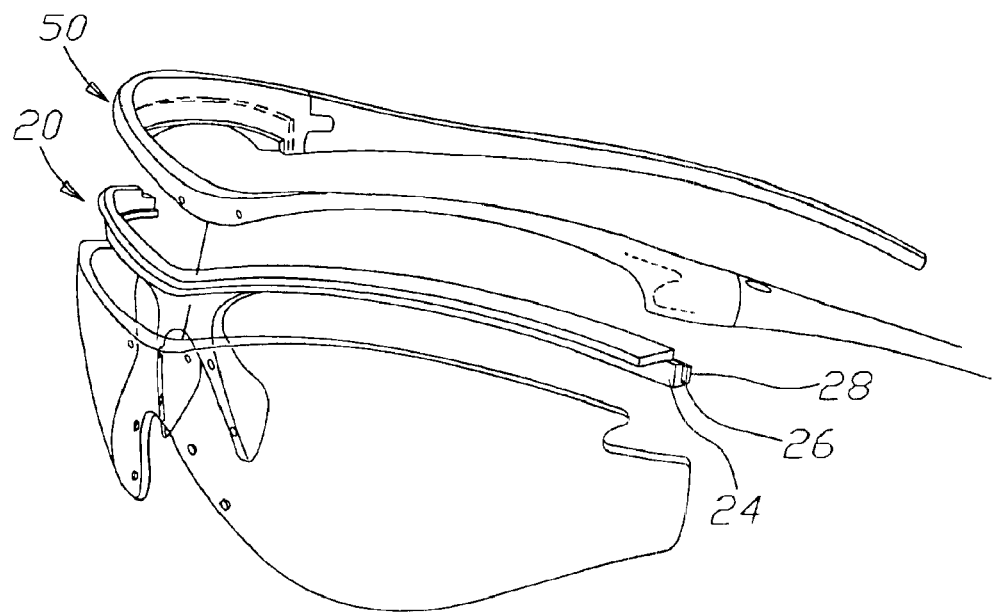
FIG. 3A is a perspective view of a third preferred embodiment according to the present invention.
Figure 3B:
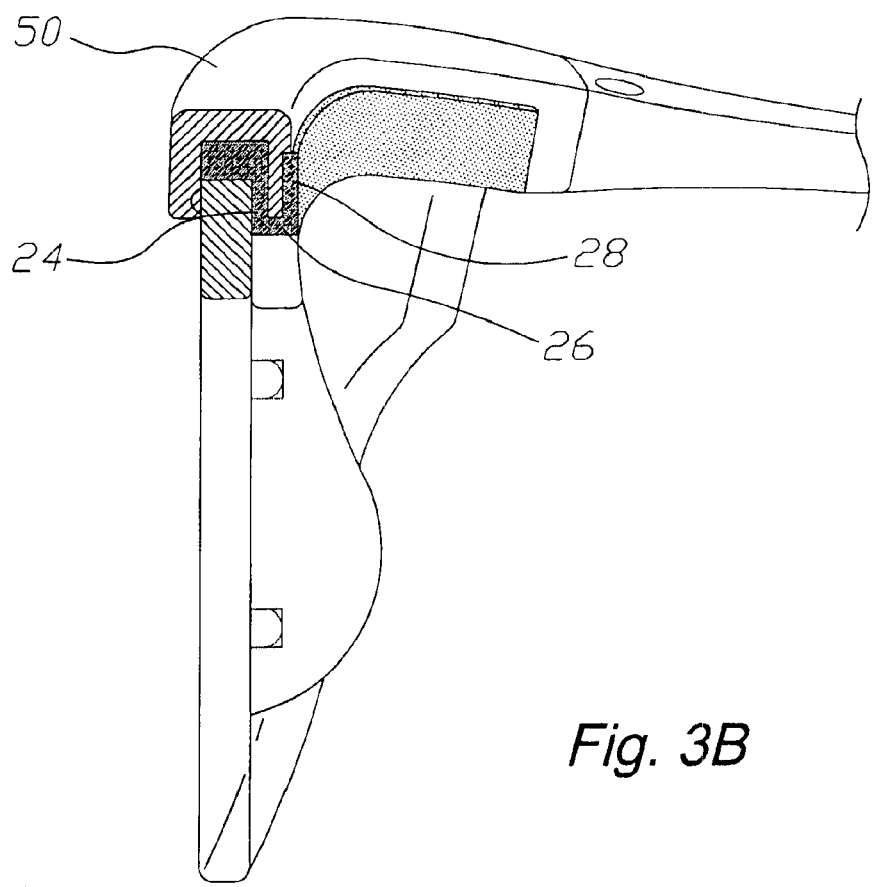
FIG. 3B is a cross-sectional view of FIG. 3A for showing assembly thereof.

Please reefer to FIGS. 3A and 3B together, which are the perspective view of a third preferred embodiment according to the present invention and the cross-sectional view of FIG. 3A for showing assembly thereof. As shown in figures, in this embodiment, the first extending pad 26 of the soft pad 20 further extends up to form a second extending pad 28 to wrap the inner edge of the fixing frame 40 or the frame body 50. The lining pad 24, the first extending pad 26 and the second extending pad 28 are of the "⊔" shape. This can strengthen the combination of the soft pad 20 and the fixing frame 40 or the frame body 50, and the second extending pad 28 will be closer to the user's face to provide comfortable wearing experiences for users.

Figure 4A:
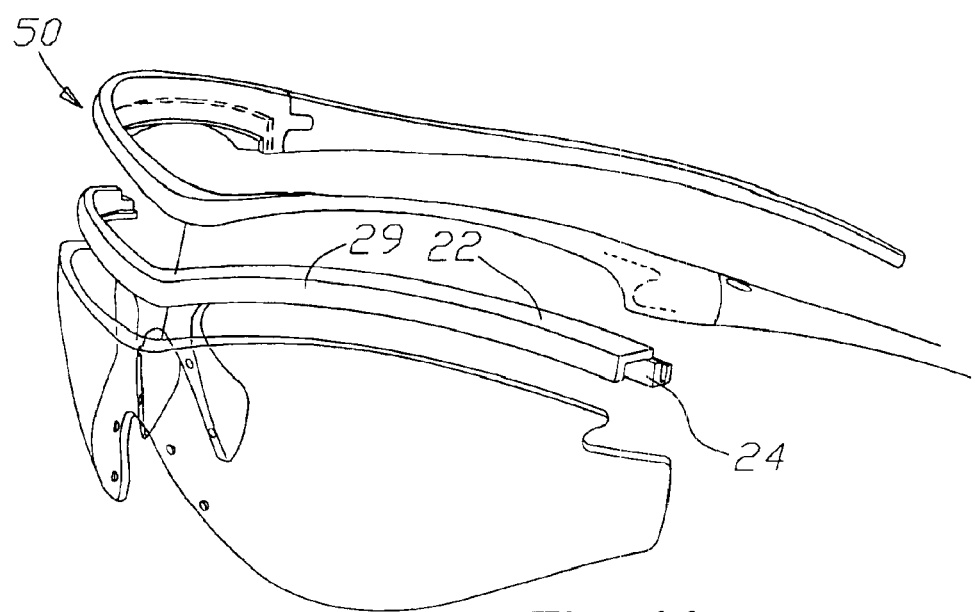
FIG. 4A is a decomposed diagram of a fourth preferred embodiment according to the present invention.
Figure 4B:
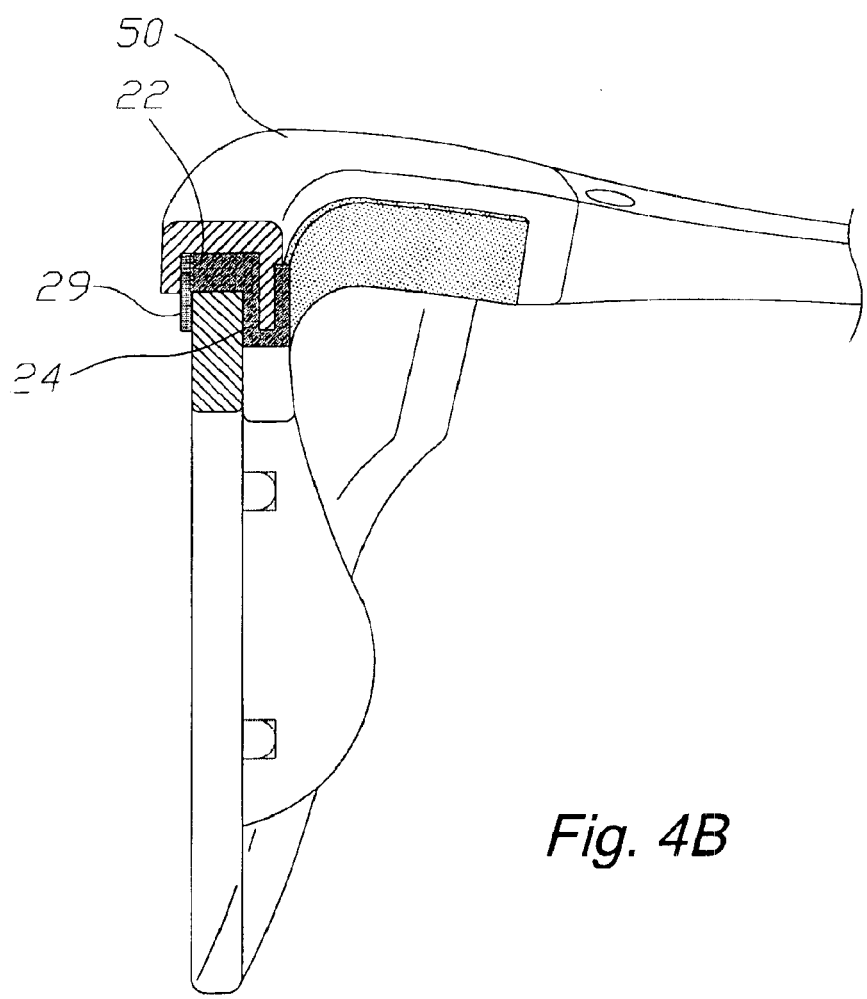
FIG. 4B is a cross-sectional view of FIG. 4A for showing assembly thereof.

Please refer to FIGS. 4A and 4B together, which are the perspective view of a fourth preferred embodiment according to the present invention and the cross-sectional view of FIG. 4A for showing assembly thereof. As shown in figures, the difference between this and above mentioned embodiments is that the fixing member 22 forwards the outer side of the eyeglass 10 and extends down to form an oblong decorative member 29 to cover the outer surface of the upper portion of the eyeglass 10. The decorative member 29, the fixing member 22 and the lining pad 24 are of a "⊓" shape, and the decorative member 29 can be designed in different colors in accordance with colors of the fixing frame 40 or the frame body 50 to enhance the appearance while wearing.

Figure 5A:
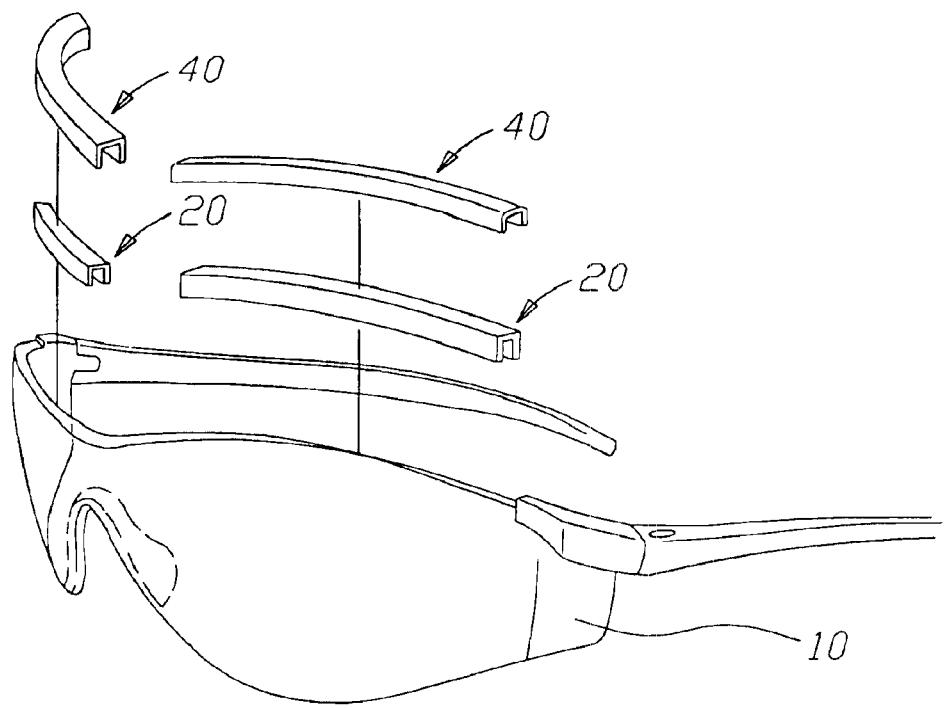
FIG. 5A is a decomposed diagram of a fifth preferred embodiment according to the present invention.
Figure 5B:
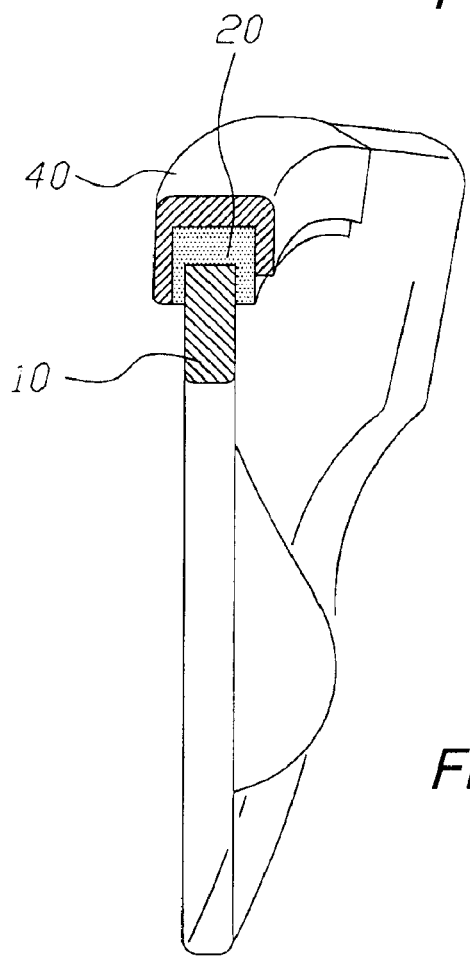
FIG. 5B is a cross-sectional view of FIG. 5A for showing assembly thereof.

Please refer to FIGS. 5A and 5B together, which are the perspective view of a further preferred embodiment according to the present invention and the cross-sectional view of FIG. 5A for showing assembly thereof. As shown in figures, the soft pad 20 can be also divided into several segments to match the colors. Relatively, the fixing frame 40 for fixing the soft pad 20 onto the eyeglass 10 is also divided into several segments to improve the practicability of the present invention.

In contrast to the prior art, in the present invention, the fixing member 22 of the soft pad 20 can extend to form the lining pad 24 and the decorative member 29. The lining pad 24 can be a leaning pad while the user wearing the glasses to improve the comfort, and the decorative member 29 can be designed in different colors to enhance the appearance while wearing. The soft pad wraps the upper edge of the eyeglass 10 with the fixing member 22, and the eyeglass 10 is embedded in the embedding trench 42 of the fixing frame 40 or the frame body 50 to assemble the soft pad 20 onto the fixing frame 40 or the frame body 50. The soft pad 20 can be assembled rapidly without any tools that is conveniently combined and easily repaired, and the lining pad 24 can extend down to form the nose pad 35 in the inverted V shape to improve the practicability of the soft pad 20.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A soft pad structure of glasses, comprising:
   an eyeglass;
   at least one soft pad including a fixing member to wrap the edge of an upper portion of the eyeglass, said fixing member being forwarded the inner side of the eyeglass extending down to form a lining pad of long shape to cover the inner surface of the upper portion of said eyeglass, and said fixing member being forwarded the outer side of the eyeglass extending down to form a decorative member of long shape to cover the outer surface of the upper portion of said eyeglass; and
   at least one fixing frame detachably capturing said soft pad against said eyeglass, said fixing frame having an embedding trench, said eyeglass and said fixing member of said soft pad being equipped in said embedding trench and assembled with said fixing frame.

2. The soft pad structure of glasses of claim 1, wherein the left side and the right side of said fixing frame can further extend out to form a frame body, and said eyeglass is embedded in said embedding trench of said frame body, and a glasses arm is provided on the left side and the right side of said frame body respectively.

3. The soft pad structure of glasses of claim 2, wherein a groove is provided on the left and right sides of the eyeglass respectively that can be embed with a protruding portion at the left and right sides of said embedding trench of said frame body.

4. The soft pad structure of glasses of claim 1, wherein said lining pad corresponding to the center position of said eyeglass further extends down to form a connection member, and the connection member forwards down and extends left and right to respectively form a nose pad strip and form a nose pad of inverted V shape.

5. The soft pad structure of glasses of claim 4, wherein said nose pad strip has an assemble member, and the center position of the eyeglass corresponding to said assemble member has a joint member for coordinating said assemble member to equip said nose pad onto said eyeglass.

6. The soft pad structure of glasses of claim 1, wherein at least one fixing pillar is provided on the surface of the eyeglass, and a fixing hole is provided on the position of said fixing frame corresponding to said fixing pillar, and said fixing pillar can be inserted into said fixing hole.

7. The soft pad structure of glasses of claim 1, wherein said decorative member, said fixing member and said lining pad are of "⊓" shape.

8. The soft pad structure of glasses of claim 1, wherein the bottom of said lining pad further extends out to form a first extending pads and said lining pad and said first extending pad are of "L" shape.

9. The soft pad structure of glasses of claim 8, wherein said first extending pad further extends up to form a second extending pad, and said lining pad, said first extending pad and said second extending pad are of "⊔" shape.

10. A soft pad structure of glasses, comprising:
an eyeglass;
at least one soft pad including a fixing member of long shape to wrap the edge of an upper portion of the eyeglass, said fixing member being forwarded the inner side of the eyeglass extending down to form a lining pad of long shape to cover the inner surface of the upper portion of said eyeglass; and
at least one fixing frame detachably capturing said soft pad against said eyeglass, said fixing frame having an embedding trench, said eyeglass and said fixing member of said soft pad being equipped in said embedding trench and assembled with said fixing frame.

11. The soft pad structure of glasses of claim 10, wherein the left side and the right side of said fixing frame can further extend out to form a frame body, and said eyeglass is embedded in said embedding trench of said frame body, and a glasses arm is provided on the left and right sides of the frame body respectively.

12. The soft pad structure of glasses of claim 11, wherein a groove is provided on the left side and right side of said eyeglass respectively that can be embed with a protruding portion at the left side and the right side of said embedding trench of said frame body.

13. The soft pad structure of glasses of claim 10, wherein said lining pad corresponding to the center position of the eyeglass further extends down to form a connection member, and said connection member forwards down and extends left and right to respectively form a nose pad strip and form a nose pad of inverted V shape.

14. The soft pad structure of glasses of claim 13, wherein said nose pad strip has a assemble member, and the center position of the eyeglass corresponding to said assemble member has a joint member for coordinating said assemble member to equip said nose pad onto said eyeglass.

15. The soft pad structure of glasses of claim 10, wherein at least one fixing pillar is provided on the surface of said eyeglass, a fixing hole is provided on the position of said fixing frame corresponding to the fixing pillar, and said fixing pillar can be inserted into said fixing hole.

16. The soft pad structure of glasses of claim 10 wherein said fixing member and said lining pad are of "⊓" shape.

17. The soft pad structure of glasses of claim 10, wherein the bottom of said lining pad further extends out to form a first extending pad, and said lining pad and said first extending pad are of L shape.

18. The soft pad structure of glasses of claim 17, wherein said first extending pad further extends up to form a second extending pad, and said lining pad, said first extending pad and said second extending pad are of "⊔" shape.

19. The soft pad structure of glasses of claim 10, wherein said fixing member forwarding the outer side of said eyeglass further extends down to form an oblong decorative member to cover the outer surface of the upper portion of said eyeglass, and said decorative member, said fixing member and said lining pad are of "⊓" shape.

20. A soft pad structure of glasses comprising:
an eyeglass;
at least one soft pad including a fixing member of long shape to wrap the edge of an upper portion of said eyeglass, said fixing member forwarding the outer side of said eyeglass extending down to form an oblong decorative member to cover the outer surface of the upper portion of said eyeglass; and
at least one fixing frame detachably capturing said soft pad against aid eyeglass, said fixing frame having an embedding trench, said eyeglass and said fixing member of said soft pad being equipped in said embedding trench and assembled with said fixing frame.

21. The soft pad structure of glasses of claim 20, wherein the left side and the right side of said fixing frame can further extend out to form a frame body, and said eyeglass is embedded in said embedding trench of said frame body, and a glasses arm is provided on the left side and the right side of said frame body respectively.

22. The soft pad structure of glasses of claim 21, wherein a groove is provided on the left side and the right side of said eyeglass respectively that can be embed with a protruding portion at the left side and the right side of said embedding trench of said frame body.

23. The soft pad structure of glasses of claim 20, wherein said fixing member forwarding the inner side of said eyeglass further extends down to form a lining pad of long shape to cover the inner surface of the upper portion of said eyeglass, and said decorative member, said fixing member and said lining pad are of "⊓" shape.

24. The soft pad structure of glasses of claim 23, wherein the bottom of said lining pad further extends out to form a first extending pad, and said lining pad and said first extending pad are of "L" shape.

25. The soft pad structure of glasses, of claim 24, wherein said first extending pad further extends up to form a second extending pad, and said lining pad, said first extending pad said the second extending pad are of "⊔" shape.

26. The soft pad structure of glasses of claim 23, wherein said lining pad corresponding to the center of said eyeglass further extends down to form a connection member, and said connection member forwards down and extends left and right to respectively form a nose pad strip and form a nose pad of inverted V shape.

27. The soft pad structure of glasses of claim 26, wherein said nose pad strip has a assemble member, and the center position of said eyeglass corresponding to said assemble member has a joint member for coordinating said assemble member to equip said nose pad onto said eyeglass.

28. The soft pad structure of glasses of claim 20, wherein at least one fixing pillar is provided on the surface of said eyeglass, and a fixing hole is provided on the position of said fixing frame corresponding to said fixing pillar, and said fixing pillar inserts into said fixing hole.

* * * * *